Patented Dec. 24, 1935

2,025,568

UNITED STATES PATENT OFFICE 2,025,568

ARTICLE AND MATERIAL CONTAINING ORGANIC DERIVATIVES OF CELLULOSE

Joseph H. Brown, Brooklyn, N. Y., assignor to Celluloid Corporation, a corporation of New Jersey No Drawing. Application May 2, 1935, Serial No. 19,384

11 Claims. (Cl. 18—56)

This invention relates to a permanently pleated or shaped sheet, film or foil containing a derivative of cellulose and to the articles made from same, and relates more particularly to sheet material so processed that, when pulled out and released, it snaps back to the shape it had prior to being pulled out.

An object of the invention is the economic and expeditious production of pleated sheets, films or foils containing derivatives of cellulose and the articles made from same. A further object of the invention is the preparation of materials suitable for decorative purposes which are substantially moisture proof and resistant to weather changes. Other objects of the invention will appear from the following detailed description.

As is known, pleated sheeting materials of paper, fabric, etc. have been used in the lamp shade industry. These materials have not been entirely satisfactory. When employing a fabric the pleats of same had to be stitched in to hold them in shape and after stitching it was impossible to place the same over irregular lamp shade forms or other articles. Where paper, parchment and like materials in pleated form were used, the pleats when once pulled out, either intentionally or accidentally, rendered the material unfit for its intended purpose as it no longer hugged and fit the form but remained permanently distorted. By employing this invention, which in general may be described as pleating thin sheets or foils of a derivative of cellulose, a product is produced which may be stretched over forms of irregular shape and which always tends to resume the shape it had before being stretched over the form.

By employing this invention, there may be formed lamp shades or other articles that have a crystal clarity which feature cannot be produced in paper, parchment, fabrics, etc. Although the material is of crystal clarity, it may be formed of any desirable thickness of sheet material so that it may possess a degree of strength suitable for the purpose intended.

A further advantage of the article produced in accordance with this invention is that it is practically moisture proof and resistant to weather changes. Thus, the material may be used in moist or damp places or extremely dry places without any substantial change in its form being effected, such as, for example, the release of the pleats or the drooping of the material in damp places, or the cracking and splitting of the material in extremely dry places. Another desirable property of the material produced in accordance with this invention is that an article made therefrom may be sponged, washed and otherwise cleaned without damage thereto since there can be no removal of the pleats or streaking of the material due to the action of the dirt and the fluid used in cleaning thereof.

This material made in accordance with this invention also has the advantage over paper, fabrics and parchment, etc. in that it has no nap or filament ends to catch dust and other materials such as normally collect on lamp shades of paper, parchment and textile fabric. The surface of the new material is smooth and does not act as a trap for dust particles and lint.

A further advantage of this invention is that although the sheeting material may be very thin and light in weight it is very durable even when pleated, and unlike paper, parchment or other sheeting materials, is not readily torn. Not only is the material durable but it also retains its pleated shape under all atmospheric conditions, thus offering a marked advantage over silk and other fabrics whose edges must be sewed together to maintain the pleat.

Pleated sheets or foils of derivatives of cellulose exhibit a unique "rubber" elasticity. They can be stretched an appreciable distance before permanent deformation takes place. In making a lamp shade, for example, a rectangular blank of pleated sheeting material containing a derivative of cellulose is cut and the two ends are cemented together with any suitable cellulose ester film cement. When this sheet which is now in tubular form is stretched over the frame of a lamp shade, it will be found that the formed sheet hugs the frame tightly and conforms to its shape even in the case where the form is concave. This is a distinct advantage, since it not only makes for economy of material but also insures permanency of form. Lamp shade blanks, as heretofore made, were usually stamped out in irregular or circular form. However, in the case of pleated sheets containing derivatives of cellulose, the blanks may be rectangular in form regardless of the shape of the frame they are to fit, thereby resulting in very little wastage in the operation of cutting. The elasticity of the pleated product can be appreciated when it is known that there is usually a length shrinkage of about 80 per cent when placing the pleats in the material, which pleated product may be pulled out or stretched to substantially its original length and upon being released returns to its shrunken length. In other words, a strip of foil 100 inches long when pleated in pleats of about ⅛ of an inch measures only 20 inches in length. The resultant elasticity, resiliency or tendency to return to its short length when the pleated foil is stretched is profitably utilized in covering and wrapping many articles of irregular shape. All other products such as paper, parchment, sheets of gelatin, sheets of regenerated cellulose, fabric, etc. do not exhibit this remarkable stretching characteristic which adapts the material of the present invention to the use of wrapping, covering or acting as a decorative material on various articles of irregular shape.

While the material of this invention may be of crystal clear transparency, it may also be attractively decorated with designs, or it may be embossed, printed, lacquered, etc. Further, the base material may contain various effect materials which alter its transparency thus producing a material which may be translucent, opaque or mottled. These transparent, translucent and opaque effects may be all-over or merely local. Moreover, these various effects may be produced in the material without adding materially to the weight thereof and without otherwise altering the physical characteristics of the clear product. The articles made therefrom are extremely light in weight, are odorless and are permanent as to their shape, color, transparency, etc.

A distinct advantage of the material of the present invention is that when using the crystal clear product it allows for the transmission of ultra-violet light rays. This quality is of great advantage in the employment of the material as lamp shades, screens, etc.

In accordance with my invention, I prepare a sheet, film or foil containing a derivative of cellulose with or without a plasticizer, by inserting bends or pleats in the sheet, film or foil under heat and pressure so that they are substantially permanent. The pleating of the sheet material in this manner results in a pleated product which may be pulled out to straighten out the pleats therein and while under this stress the material exerts a strong force to resume its pleated shape, giving the effect of an elastic material. In accordance with this invention, I form articles by stretching this pleated material over suitable forms in order to produce lamp shades, screens, flower pot covers and other articles.

Any suitable thermoplastic sheet, film or foil made of or containing derivatives of cellulose may be pleated, or employed as the base material in forming the pleated sheets. Sheets, films and foils of organic derivatives of cellulose, organic derivatives of cellulose mixed with plasticizers, organic derivatives of cellulose mixed with or without plasticizers and with effect materials may be employed. The sheet, film or foil which is pleated may be of any suitable thickness, for instance, from .0005 inch to .015 inch, preferably from .0008 inch to .003 inch. Although cellulose acetate is the preferable organic derivative of cellulose to be employed as the base of sheet material, other suitable organic derivatives of cellulose may be employed such as the organic acid esters of cellulose and the cellulose ethers. Examples of the organic acid esters of cellulose are cellulose formate, cellulose butyrate and cellulose propionate while examples of ethers are methyl cellulose, ethyl cellulose and benzyl cellulose. While organic derivatives of cellulose, such as cellulose acetate are preferred, cellulose nitrate foils and films may also be satisfactorily pleated with heat and pressure. After the thermoplastic sheet has been formed into pleats, the pleated sheet may be given a denitrating treatment with alkaline solutions such as caustic soda, sodium hydrosulphide, etc.

The sheet stock to be pleated preferably contains from 5 to 100 per cent or more, based on the weight of the cellulose derivative present, of any suitable pure plasticizer, the amount of plasticizer employed depending upon the type and amount of effect materials, if any, contained in the sheets. Although any suitable plasticizer may be employed, for forming crystal clear thin organic derivative of cellulose sheets having especially high resiliency, it is preferable to employ from 5 to 30 per cent based on the weight of the organic derivative of cellulose present of dibutyl phthalate.

The plasticizer may be any suitable one for the particular cellulose derivative or mixture of cellulose derivatives employed. The plasticizers may be any of the high boiling solvents or softening agents, as for example, aryl sulphonamides, e. g. para-ethyl-toluol sulphonamide; the alkyl phthalates, e. g. dimethyl phthalate; the dialkyl tartrates, e. g. dibutyl tartrate; the alkoxy esters of polybasic organic acids, e. g. dimethoxy ethyl phthalate; the polybasic acid esters of the mono alkyl ethers of polyhydric alcohols, e. g. diethylene glycol ethyl ether ester of phthalic acid; the alkyl esters of phosphoric acid, e. g. triethyl glycol phosphate, the aryl esters of phosphoric acid, e. g. tricresyl phosphate; the mixed alkyl and aryl phosphates, e. g. ethylglycol dicresyl phosphate, and camphor.

The sheet stock which is to be pleated may contain any suitable effect materials which effect materials may be employed to alter the transparency, resiliency, color, handle, fluorescence or other properties of the material. Thus, such effect materials as pigments, filling materials, dyes or lakes, fire retardants, plasticizers, waterproofing agents, etc. may be employed. Examples of fire retardants are beta chlornaphthalene, triphenyl phosphate, tricresyl phosphate, etc. Examples of filling materials that may be employed are powdered metals such as aluminum powder, bronze powder, etc., oxides and salts of metals such as antimony oxide, tin oxide, silky variety of mercurous chloride, lead iodide, lead oxide, lead carbonate, etc., or other filling materials such as powdered glass, metallic threads or lahm; organic materials such as fibres of cotton, wool, etc. or organic compounds such as resins, etc. These effect materials may be incorporated with the sheet, film or foil stock by mixing the same with the solution from which they are formed, by rolling them into the material during the formation of the film, foil or sheet, or by applying the same to the formed sheet in the presence of suitable solvents or swelling agents.

The sheet, film or foil may be pleated in any suitable manner, for instance, by running the same through a fabric pleating machine after having placed on either or both sides of the sheet a thin sheet of paper as a guide and/or protection. The stock may be conditioned prior to passing it through the pleating machine by passing the same through a steam chamber, a chamber containing solvent vapors for the material of the stock, through a heated chamber, or through a heated liquid such as water. The material may be shaped into any desired form of pleat. I prefer, however, that the space between the bends of the material upon itself be of the order of less than one-half inch. Sheets having pleats of about one-eighth inch between bends have been found to be highly suitable for lamp shades and similar uses. However, larger or smaller pleats may be employed. The material may be formed into accordion pleats, box pleats, crystal pleats or other types of pleats, or the material may have more than one type of pleat formed therein.

When inserting pleats in the sheet, film or foil it is preferable to set the pleat in the material by the aid of heat. The pleating roll of the pleating machine may be heated by steam, electric conductance or resistance coils or open flame in such a manner that the material while being held in the pleated form, by steel bands or other pressing device, is plasticized or softened sufficiently that any stress in the material to straighten out is removed. While in the pleated form the material may be cooled, by contact with the air or it may be chilled by passing the same over a metallic roll or other device having a cooling medium circulating therein, for the purpose of setting the bends in the material prior to any considerable amount of handling of the material. By this means the micelles in the base material are rearranged such that the bends forming the pleats are made permanent or substantially so, giving to the material the property of exerting a force such that when pulled out it tends to return to its tightly pleated condition.

This pleated material may also be formed into articles, such as coverings for flower pots, hoods for protecting flowers, plants, etc., hat bands, brims, ribbons, etc. Straw hats made with pleated sheets either alone or composited with suitable base materials, will be found light, waterproof, washable, etc. The pleated material finds other uses, such as for bracelets, eye shades, novelties, curtains, blinds, screens, garters, belts, cake receptacles, candy wrappers, corsage ribbons, card index holders, tabs, etc. The pleated material may be stretched over any object having sufficient rigidity to support same. For instance, metallic wire lamp shade forms, clay flower pots, whale-bone articles and wearing apparel, etc. may be employed as the base over which the pleated material is stretched.

The pleated material may be readily cemented at the seams to make a stretchable tubing for countless applications. The cement may be applied to the edges of the pleated material to hold or weld it to metal frames such as lamp shade frames and the like. Thus in the case of concave lamp shades, when the pleated cylinder "stocking" is stretched over the frame, there will be a tendency of this material to spring upwards unless it is attached to the frame either by welding it thereto with cement or binding it thereto with a suitable tape or braiding. Suitable tape or braiding may be formed or molded from organic derivatives of cellulose or woven from textile materials and the same may be attached to the pleated sheet material by applying a solvent or cement to the pleated material and pressing the tape or braiding into the softened material.

In forming covers for various articles, the pleated sheet, being plastic and moldable under heat and pressure, may be ironed smooth at places where flatness is desired. This is a property characteristic only of this material and is not found in any other type of cover now employed. This property allows for very distinctive effects made by heat-sealing certain areas of the pleated material which have previously been softened with solvents, etc. The subsequent crinkling that may take place, the result of using softening solutions and/or heat, produces a very desirable effect. Further, the property of it being possible to remove the pleats from certain areas of the material allows for covers, not only having distinctive effects, but which may be shaped to enhance the utility of the material where the utility of the material would require a flat surface not containing pleats, for example, the bottom part of covers for containers, parts of lamp shades that are to be placed between a wall and lamps or any other limited space wherein the pleats would give rise to too thick a material.

Two or more layers of the pleated material having the same size pleats or different size pleats may be imposed one upon the other with or without additional material between the layers. The pleats in the two layers may be caused to run parallel or they may be run at right angles to each other to produce novel effects, particularly, when the different layers have variegated color effects. The pleated material may also be stretched fan shaped and the fan may be cemented to glass or other base material to yield ornamental radiating effects suitable for placing at the back of wall lights, lights on mirrors and the like. This use of the material produces a most striking appearance when lacquered with pearl essence.

Prior to pleating the film or foil, the same may be laminated with paper, silk and cellulosic fabrics, cellulosic sheet material, and other relatively flat, thin materials that may be lacking in that property that gives the elastic-like springiness to the pleated films containing an organic derivative of cellulose. The film or foil containing an organic derivative of cellulose may be laminated with the other materials by cementing agents with or without heat and pressure. Examples of cementing agents that may be employed are those described in U. S. Patents Nos. 1,981,141 and 1,835,619. Thus an elastic-like material may be formed that has a cloth-like appearance by cementing a fabric to one or both sides of a film containing an organic derivative of cellulose and pleating the same in the presence of heat and under pressure. Also the film or foil containing an organic derivative of cellulose may be laminated with a film or foil having an embossed surface in imitation of crepe or other design.

A further modification may be formed by laminating an edging, such as a fold of paper, metal foil, cotton fabric, rayon fabric, cellulose acetate fabric or transparent sheet material of regenerated or reconstituted cellulose, to the sheet material containing an organic derivative of cellulose which itself may be laminated as described above. After laminating the sheet material with the other materials the same may be pleated. By this means both ornamental and protective edgings may be placed on the material. An example of this modification is in pleated collars for women or children, which are edged with a fabric to reduce the tendency of the sharp corners of the pleated material to irritate the skin that they contact.

The material, regardless of the shape in which it is formed, may be sprayed, brushed, dipped or otherwise treated with lacquers, varnishes, etc. in the form of solid colors, variegated colors in patterns, or flowers and other designs may be stenciled or painted on the same. This produces, when using the crystal clear material, novel effects not attainable by the use of any other material now known in the art.

In the claims the term "sheets" is intended to include sheets, films and foils that may be formed by any suitable method. For instance, sheets may be formed by cutting the same from a solid block of an organic derivative of cellulose and plasticizer that may have been block-pressed in the presence of heat, while films and foils may be formed by extruding a solution of an organic derivative of cellulose, in a volatile solvent, through suitable orifices into an evaporative or precipitating medium or they may be formed by casting the solution upon a surface, preferably a film casting wheel or the like.

It is to be understood that the foregoing detailed description is merely given by way of illustration and many variations may be made therein without departing from the spirit of my invention.

Having described my invention, what I desire to secure by Letters Patent is:

1. An article of manufacture comprising a substantially permanently pleated sheet containing an organic derivative of cellulose, said pleated sheet being extensible without loss of its pleated form.

2. An article of manufacture comprising a substantially permanently pleated foil containing an organic derivative of cellulose, said sheet being less than .015 inch thick, said pleated foil being extensible without loss of its pleated form.

3. An article of manufacture comprising a substantially permanently pleated sheet containing cellulose acetate, said pleated sheet being extensible without loss of its pleated form.

4. An article of manufacture comprising a substantially permanently pleated foil containing cellulose acetate, said sheet being less than .015 inch thick, said pleated foil being extensible without loss of its pleated form.

5. An article of manufacture comprising a substantially permanently pleated sheet containing an organic derivative of cellulose and a plasticizer for the organic derivative of cellulose, said pleated sheet being extensible without loss of its pleated form.

6. An article of manufacture comprising a substantially permanently pleated sheet containing cellulose acetate and a plasticizer for the cellulose acetate, said pleated sheet being extensible without loss of its pleated form.

7. An article of manufacture comprising a substantially permanently pleated foil containing an organic derivative of cellulose and a plasticizer, the pleats being of an order less than one-half inch, said pleated foil being extensible without loss of its pleated form.

8. An article of manufacture comprising a substantially permanently pleated foil containing cellulose acetate and a plasticizer, the pleats being of an order less than one-half inch, said pleated foil being extensible without loss of its pleated form.

9. An article of manufacture comprising an accordion pleated sheet, capable of being stretched without removing the pleats, containing an organic derivative of cellulose and from 5 to 30 per cent of a plasticizer.

10. An article of manufacture comprising an accordion pleated sheet, capable of being stretched without removing the pleats, containing cellulose acetate and from 5 to 30 per cent of a plasticizer.

11. An article of manufacture comprising an accordion pleated sheet containing cellulose acetate and from 5 to 30 per cent of dibutyl phthalate, said pleated sheet being extensible without loss of its pleated form.

JOSEPH H. BROWN.